US007146351B2

(12) United States Patent
Sweitzer et al.

(10) Patent No.: US 7,146,351 B2
(45) Date of Patent: *Dec. 5, 2006

(54) SYSTEM AND METHOD FOR ANALYZING SOFTWARE COMPONENTS USING CALIBRATION FACTORS

(75) Inventors: John William Sweitzer, Austin, TX (US); Douglas Andrew Wood, Indianapolis, IN (US)

(73) Assignee: International Business Machines Corporation, Armonk, NY (US)

(*) Notice: Subject to any disclaimer, the term of this patent is extended or adjusted under 35 U.S.C. 154(b) by 634 days.

This patent is subject to a terminal disclaimer.

(21) Appl. No.: 09/996,129

(22) Filed: Nov. 28, 2001

(65) Prior Publication Data

US 2003/0101180 A1   May 29, 2003

(51) Int. Cl.
*G06F 17/30* (2006.01)
(52) U.S. Cl. ............... 707/1; 707/102; 707/200
(58) Field of Classification Search .......... 707/1–10, 707/100–104.1, 200; 705/1–10, 25–30; 345/764, 345/788, 804; 717/104, 107, 135, 175, 180–181
See application file for complete search history.

(56) References Cited

U.S. PATENT DOCUMENTS

| 6,151,707 | A  | * | 11/2000 | Hecksel et al. ............ 717/178 |
| 6,327,551 | B1 |   | 12/2001 | Peterson et al. ............ 703/1 |
| 6,370,578 | B1 | * | 4/2002  | Revashetti et al. ......... 709/224 |
| 6,377,934 | B1 | * | 4/2002  | Chen et al. ................. 705/10 |
| 6,662,357 | B1 | * | 12/2003 | Bowman-Amuah ........ 717/120 |
| 6,700,590 | B1 | * | 3/2004  | DeMesa et al. ............. 345/744 |
| 6,772,216 | B1 | * | 8/2004  | Ankireddipally et al. ... 709/230 |
| 6,851,104 | B1 |   | 2/2005  | Rodrigues da Silva ..... 717/104 |
| 2002/0042751 | A1 | * | 4/2002  | Sarno ......................... 705/26 |
| 2002/0087945 | A1 |   | 7/2002  | Marshall et al. ............ 717/107 |
| 2002/0108099 | A1 | * | 8/2002  | Paclat ......................... 717/102 |
| 2002/0116389 | A1 | * | 8/2002  | Chen et al. ............. 707/103 R |
| 2002/0120917 | A1 | * | 8/2002  | Abrari et al. ............... 717/110 |
| 2002/0133368 | A1 | * | 9/2002  | Strutt et al. ................. 705/1 |
| 2002/0169658 | A1 | * | 11/2002 | Adler ......................... 705/10 |
| 2002/0191014 | A1 | * | 12/2002 | Hsieh et al. ................ 345/738 |
| 2003/0101250 | A1 | * | 5/2003  | Sweitzer et al. ............ 709/223 |

FOREIGN PATENT DOCUMENTS

EP     0869449     * 10/1998     ............... 17/50

(Continued)

OTHER PUBLICATIONS

GeoSolutions consulting, "company profile", Sep. 2001 20 pages.*

(Continued)

*Primary Examiner*—Srirama Channavajjala
(74) *Attorney, Agent, or Firm*—Van Leeuwen & Van Leeuwen; Jeffrey S. LaBaw

(57) ABSTRACT

Calibration factors determine how topograpy components are designed and built in order to support the management philosophies and methodologies. A marketing analysis may be used to identify the calibration factors that are needed to support a large market. In this manner, many calibration factors may be applied to a single topography requirement so that multiple operating environments and multiple management philosophies are supported by the topography. The components are stored in a component library and calibration factors corresponding to the components are stored in a data store. A customer's management philosophy, methodology, and operating environments are compared with the component metadata in order to identify suitable topography components which are installed on client computer systems to form to topography. Topography-neutral application components are adapted for installation on any topography regardless of the customer's management characteristics and operating environments.

14 Claims, 12 Drawing Sheets

FOREIGN PATENT DOCUMENTS

| WO | WO 02/039216 | * | 5/2002 | |
|----|--------------|---|--------|---|
| WO | WO 03/089954 | * | 10/2003 | ............... 5/14 |

OTHER PUBLICATIONS

S.Gokhun Tanyer et al. "Topography based design of the T-DAB SFN for a mountainous area", IEEE transactions on broadcasting, vol. 43, No. 3, Sep. 1997, pp. 309-319.*

Wolf-Fritz Riekert, "Cooperative management of data and services for environmental applications", 1995, pp. 1-8.*

R.Agarwal et al. "Estimating softwae projects", ACM SIGSOFT Software engineeeng notes, vol. 26, issue 4, Jul. 2001, pp. 60-67.*

Randall Jensen, "Software estimating model calibration", Software Engineering, Inc. Best Practices, Jul. 2001, pp. 13-16.*

* cited by examiner

SYSTEM AND METHOD FOR ANALYZING SOFTWARE COMPONENTS USING CALIBRATION FACTORS

RELATED APPLICATION

This application is related to the following co-pending U.S. Patent Application filed on the same day as the present application and having the same inventors and assignee: "Factors System and Method for Developing Topography Based Management Systems" Application Ser. No. 09/996,131, published May 29, 2003 as U.S. Pat. Publ. 2003-0101250-A1), by Sweitzer and Wood and assigned to the IBM Corporation.

BACKGROUND OF THE INVENTION

1. Technical Field

The present invention relates in general to a method and system for developing computer software systems. More particularly, the present invention relates to a system and method for providing a topography oriented to customer needs and topography neutral components installable on one or more topographies.

2. Description of the Related Art

Traditional software products are designed and implemented with a particular management philosophy or methodology focus. For example, a distributed software product may be designed with a client-server framework to support distributing application functionality on client computers while maintaining a link to a more centralized server system. On the other hand, a centralized system may be designed and deployed with tight integration between user interfaces and central processing because all processing is performed on a large centralized system.

Customers of software products have a particular culture that is manifested in each customer's management philosophy, or methodology, as well as each customer's infrastructure. To some extent, the type of business in which the customer is engaged helps determine the philosophy and infrastructure that will be employed.

In traditional systems, customers are often faced with surveying a wide variety of software solutions to determine which solution is the best fit for the customer. For example, a small, centralized customer would be ill-suited for a large, distributed software application. While a particular solution may be advantageous to one customer, it may be disastrous to another customer—even if the two customers are in the same general business field. This again is due to differences in the customers' management philosophies and methodologies. While the solution may readily work for one customer, the solution itself assumes or requires a particular management philosophy.

Software developers are faced with an increasing challenge in developing software solutions for a variety of customers with a variety of management philosophies while, at the same time, limiting the number of versions of software products so that each version is profitable and costs incurred maintaining the various versions are reduced. Because of these challenges, software developers often focus an application on one or two general types of customers. For example, a software manufacturer of an accounting package may create one version of a product for a large centralized system deployed on a centralized mainframe that is designed for a large, institutional customer. Because of costs involved in designing the accounting package for a different environment, such as customers with a more distributed management philosophy wherein organizational units are separated into branch offices, the software manufacturer may resist porting the software package to additional environments.

Indeed, adding compatibility for different operating environments (i.e., UNIX™ based, MS-Windows™ based, mainframe (IBM MVS™ based), etc.), causes increased complexity for maintaining and marketing the products to perspective customers. Because of these challenges, many software vendors have selected a particular management philosophy model, such as large customers with centralized philosophies, or smaller customers with distributed philosophies, and focused development areas on the selected philosophy model. Other vendors have addressed these challenges by providing customized software solutions for a particular software area. The challenge with customized solutions, however, is the increased cost and deployment time required versus off-the-shelf software packages, and the challenge of maintaining numerous unique custom solutions.

What is needed, therefore, is a way to separate the topographical aspects of software applications from the particular software applications functions. Topographical aspects are needed to be directed towards particular management philosophies, while software application functions are needed to be neutral of topography constraints and assumptions. Furthermore, what is needed is a method of analyzing software components using a variety of calibration factors that can be combined to form a topography designed for a particular customer.

SUMMARY

It has been discovered that a software system can be designed using a layered approach that provides a topography that is suitable to a particular management philosophy or particular customer requirements. The topography can be viewed as a fabric that provides an infrastructure that supports the customer's management philosophy and other requirements.

Topography components are designed and created to address the topography design. Calibration factors determine how the components are designed and built in order to support the management philosophies and methodologies. A marketing analysis may be used to identify the calibration factors that are needed to support a large market. For example, calibration factors may include whether the topography is centralized, a branch office, transaction based, a small team, a hybrid, discipline oriented, resource oriented, personal, or no management required. Calibration factors may also take into account the underlying operating environment, such as whether an MS-Windows™, UNIX, or IBM mainframe operating environment is supported. In this manner, many calibration factors may be applied to a single topography requirement so that multiple operating environments and multiple management philosophies are supported by the topography. The calibration factors may be applied to all the topography requirements so that a customer with a particular management philosophy and operating environment can be supported by the topography. A common topography component can be adapted to support a number of calibration factors by including options that are applied to the component. The components are stored in a component library and the information, such as component identifiers, operating environment information, and component options are stored in a component metadata database.

A customer's management philosophy, methodology, and operating environments are compared with the component metadata in order to identify suitable topography components. The identified topography components are retrieved from the component library and installed on the customer's computer systems. Topography-neutral application components are designed and created to be installed on any topography regardless of the customer's management characteristics and operating environments.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
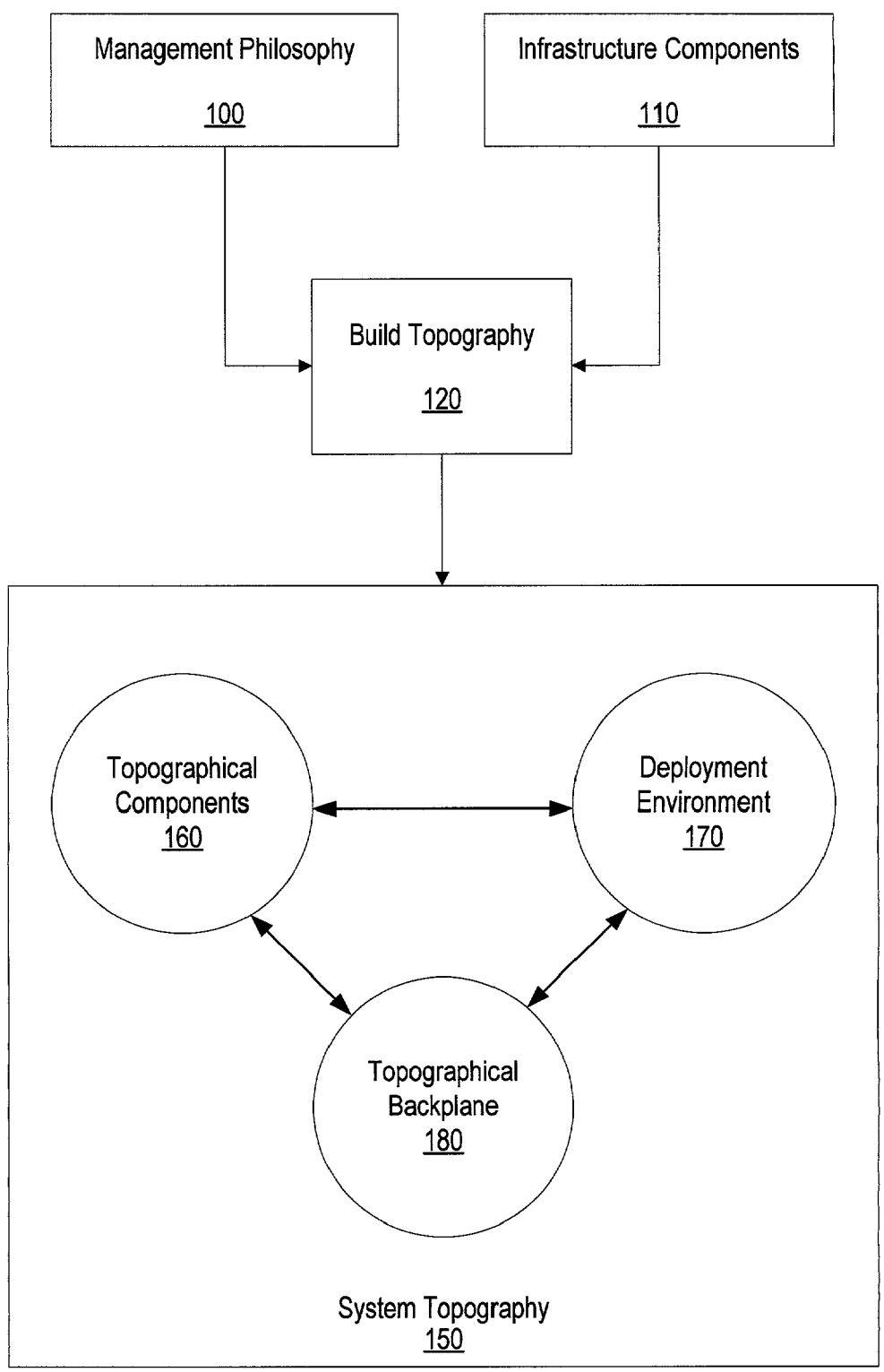
FIG. 1 is a high level diagram of building a system topography based upon a client's philosophies and infrastructure.

FIG. 1 shows a high level diagram of building a system topography based upon a client's philosophies and infrastructure. A client's management philosophy 100 is analyzed in order to determine which infrastructure components 110 to use in order to build a client topography (step 120) that best suits the client's needs. The resulting client's system topography 150 includes topographical components 160 that interrelate to one another using topographical backplane 180 that facilitates communication between the components. System topography 150 also includes deployment environment 170 for interfacing with users of the topography as well as managed resources that are outside of the topography. Deployment environment 170 uses topographical components 160 that provide for deployment functions as well as topographical backplane 180 that facilitates communication between the deployment environment components as well as other components.

Figure 2:
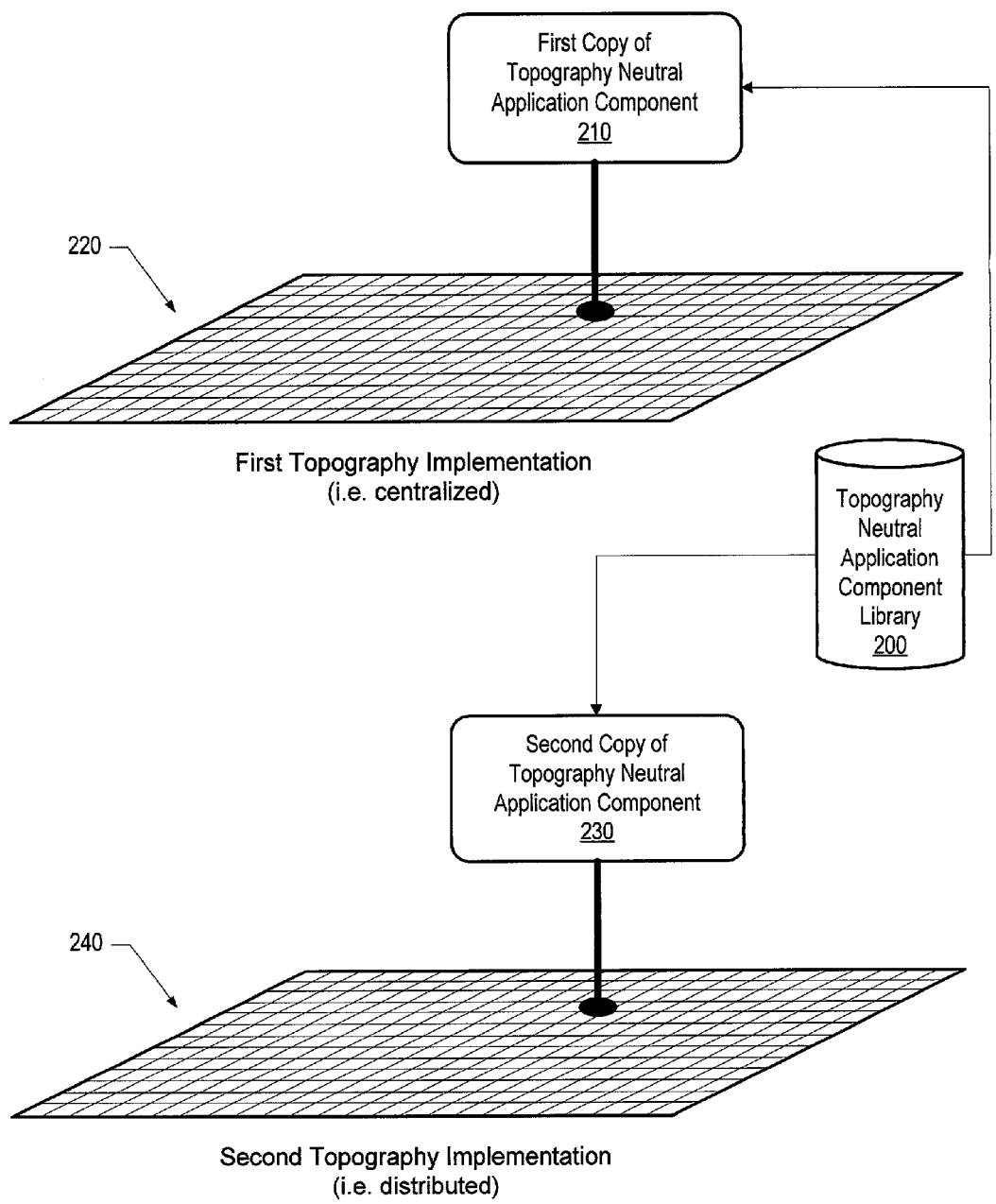
FIG. 2 is a diagram of a topography neutral component being installed on two different topographies.

FIG. 2 shows a diagram of a topography neutral component being installed on two different topographies. Two different topographies are shown (topography 220 and 240). Each of the topographies is designed to function with a particular management philosophy. For example, topography 220 may be serve a centralized management philosophy, while topography 240 may serve a distributed management philosophy (such as a management model that uses several branch offices to manage the organization). While each of the topographies may be vastly different in terms of operating environments and components used to implement the topography, common application components are used to provide specific application functions. The application components are designed and created to be topography-neutral so that a common application component can be used with different topographies.

In the example shown, topography neutral application component library 200 includes one or more application components. A common application component can therefore be used by multiple topographies. A common application component is shown installed on both topography 220 (first copy of application component 210), and topography 240 (second copy of application component 230). First copy of application component 210 and second copy of application component 230 are substantially similar so that no development work is needed to provide the application component on different topography installations.

Figure 3:
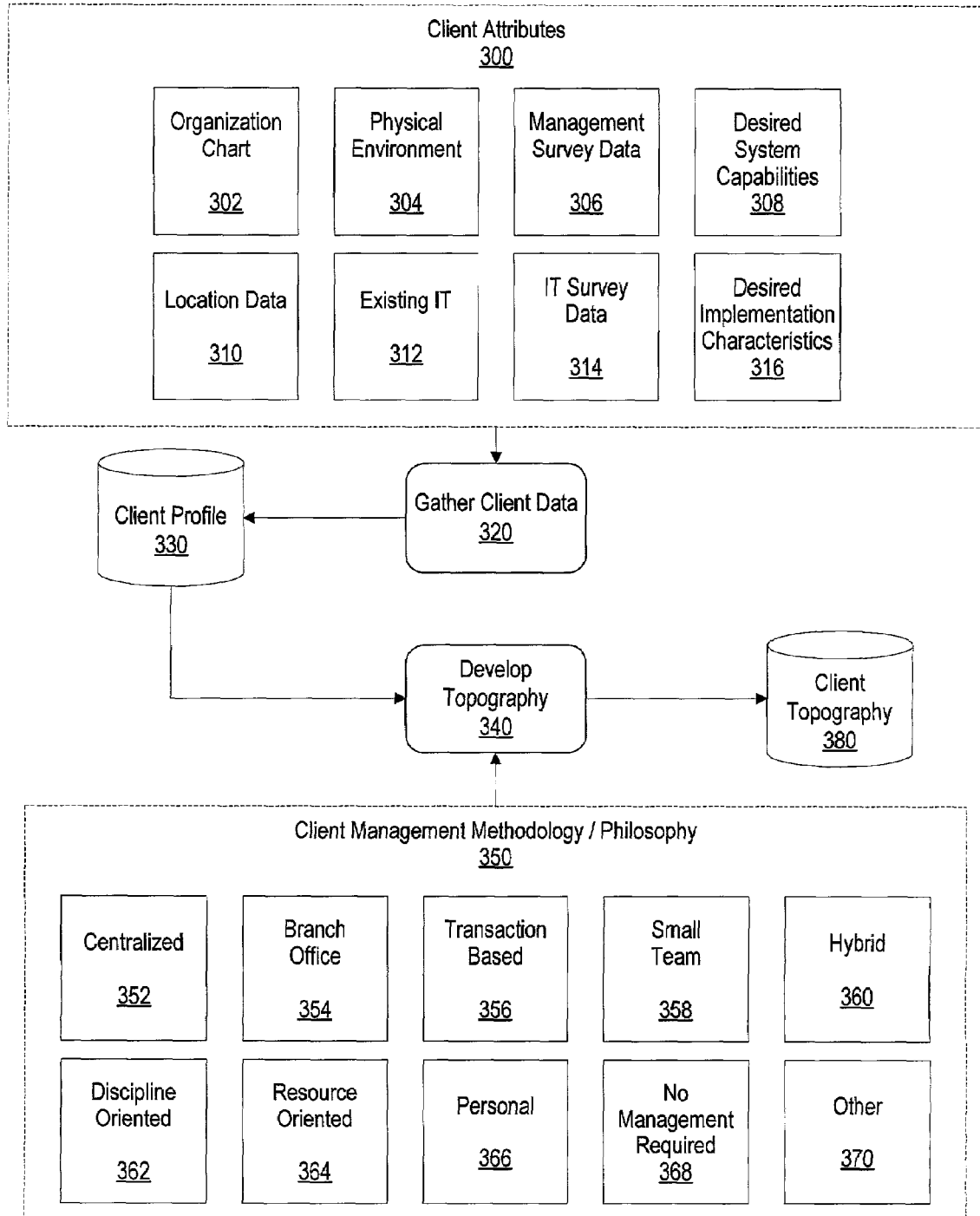
FIG. 3 is a high level diagram showing the development of a client topography based on client analysis.

FIG. 3 shows a high level diagram showing the development of a client topography based on client analysis. Clients have a variety of attributes that can be analyzed to determine which topography is likely to perform well considering the client's management methodology and philosophy.

Client attributes may be gathered (process 320) by analyzing a variety of client attributes 300. These attributes may include the client's organization chart 302, the client's physical environment 304, management surveys 306, desired system capabilities as expressed by client management, client users, and client IT professionals 308, location data 310 that describes the physical locations onto which the topography needs to operate, the client's existing information technology 312, information technology surveys 314, and other desired topography implementation characteristics 316.

The topography provider gathers the client data (process 320) and prepares client profile 330 which includes data to describe the client's management methodology and philosophy. The client profile is used to compare with other topography models that have been prepared and which include one or more topography components by developing the client topography (process 340). Client management methodology and philosophy 350 includes a number of models to match against client profile 330. These models may include centralized model 352, branch office model 354, transaction based model 356, small team model 358, hybrid model 360, discipline oriented model 362, resource oriented model 364, personal model 366, no management required model 368, and other models 370. Each of these models, in turn, may have further sub-models designed to more particularly match against a given client profile. For example, one branch office model may include a number of MS-Windows™ based personal computer systems at individual branch offices and a mainframe computer system at a corporate office, while another branch office model may include an IBM AS/400™ computer system at branch office locations and a larger AS/400™ computer system at a corporate office location. These sub-models are also taken into consideration in order to develop topography (process 340) which results in client topography 380.

Figure 4:
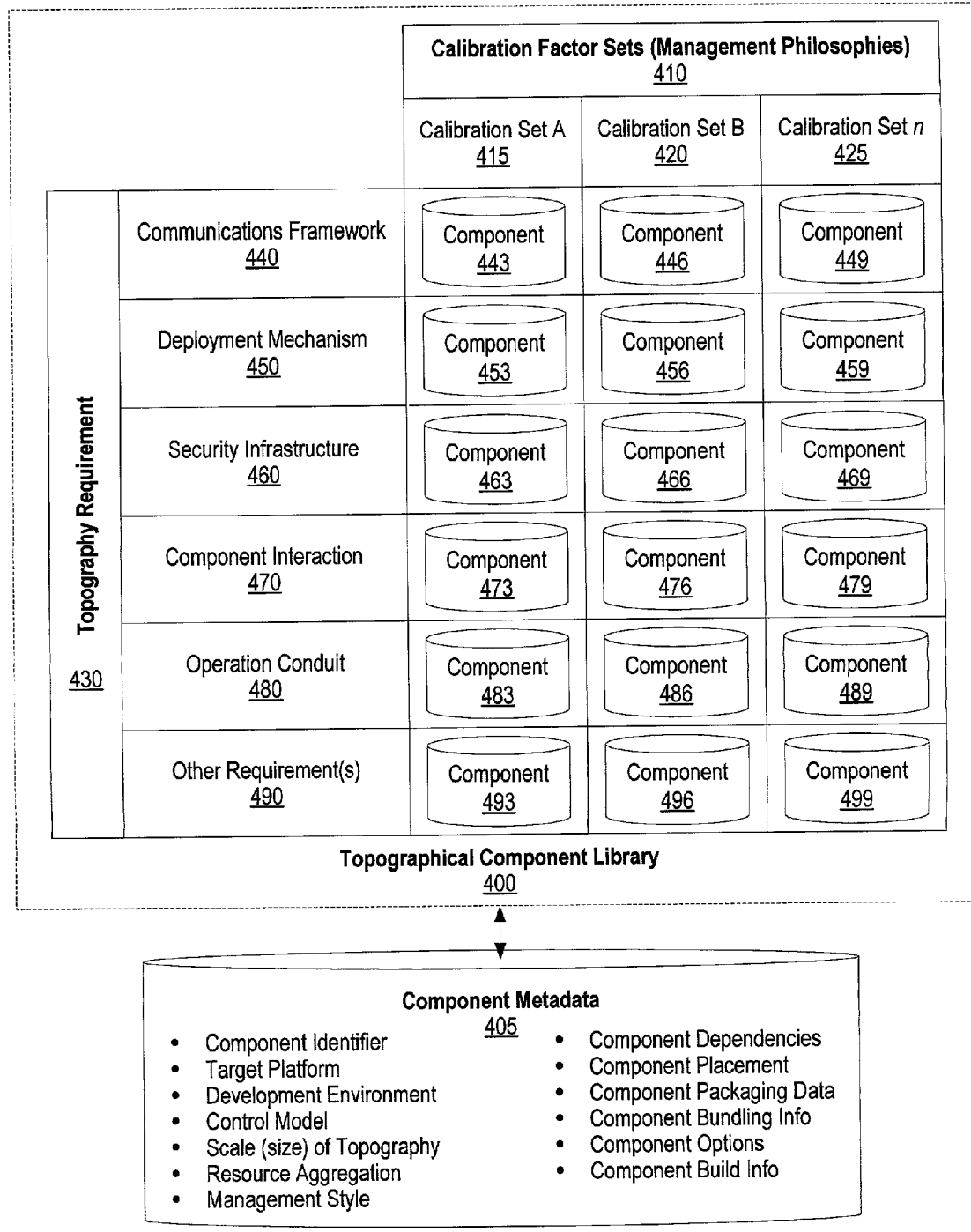
FIG. 4 is a diagram of a topographical component library with various calibration factor sets and component metadata describing the various components.

FIG. 4 shows a diagram of a topographical component library with various calibration factor sets and component metadata describing the various components. A topography provider determines which topography requirements are needed to be provided by the topography as well as which calibration factor sets, or management philosophies, that will be supported. These topography requirements and calibration factor sets are used to create topography component library 400 which includes individual components used to form a client topography. Data about each topography component is stored in component metadata store 405 so that components can be analyzed and located.

Component metadata 405 includes a component identifier which uniquely identifies the component so that it can be retrieved. Component metadata 405 also includes target platform information identifying which types of computers or operating systems the particular component can be installed upon. Other information regarding the development environment, control mode, scale (or size) of the topography, resource aggregation, and management style is also maintained. In addition, technical information concerning component dependencies between the component and other components is included as well as component placement information, component packaging data, component bundling data, component options that can be specified, and component build information (i.e., compiling and linking information) is also maintained in component metadata 405.

Topographical component library 400 includes a number of components directed towards various topography requirements 430 and calibration factor sets 410. Topography requirements 430 may include communications framework 440, deployment mechanism 450, security infrastructure 460, component interaction 470, and operation conduit 480. Additional requirements 490 may also be included to provide other topographical functionality. Components are developed to provide the topography requirement functionality and directed towards different calibration factor sets. For example, a different component may be needed to provide communications framework 440 in a centralized versus a branch office implementation. Furthermore, a requirement such as security infrastructure, may have different components to address differing client needs. For example, a retail establishment and a securities broker may each have a branch office management philosophy, however the securities broker may have a need for a higher security infrastructure because of the confidential nature of the service provided as well as the need to comply with regulations enforced by the SEC or other governmental agencies.

Calibration factor sets 410 address the differing topography needs of clients based on clients' management philosophies and topographical needs. In the example shown, calibration set A (415) includes components to include in order to implement the topography requirements for a particular management philosophy, while calibration set B (420) includes components to install for another management philosophy, and calibration factor set n (445, symbolizing numerous other calibration factor sets), includes component to install for yet more management philosophies.

In the example shown, communications framework 440 is implemented with components 443, 446, and 449 that correspond to calibration factor sets A (415), B (420), and n (425), respectively. Likewise, deployment mechanism 450 is implemented with components 453, 456, and 459 that correspond to calibration factor sets A (415), B (420), and n (425), respectively. Similarly, security infrastructure 460 is implemented with components 463, 466, and 469 that correspond to calibration factor sets A (415), B (420), and n (425), respectively. Component interaction 470 is implemented with components 473, 476, and 479 that correspond to calibration factor sets A (415), B (420), and n (425), respectively. Operation conduit 470 is implemented with components 473, 476, and 479 that correspond to calibration factor sets A (415), B (420), and n (425), respectively. And finally, other requirement(s) 490 are implemented with components 493, 496, and 499 that correspond to calibration factor sets A (415), B (420), and n (425), respectively.

Examining topographical component library 400 in terms of calibration factors 410 shows that a topography that is directed towards calibration factor set A (415) is implemented using components 443 (for communications framework), 453 (for deployment mechanism), 463 (for security infrastructure), 473 (for component interaction), 483 (for operation conduit), and 493 (for other requirements). Likewise, a topography that is directed towards calibration factor set B (420) is implemented using components 446 (for communications framework), 456 (for deployment mechanism), 466 (for security infrastructure), 476 (for component interaction), 486 (for operation conduit), and 496 (for other requirements). Finally, a topography that is directed towards calibration factor set n (425) is implemented using components 449 (for communications framework), 459 (for deployment mechanism), 469 (for security infrastructure), 479 (for component interaction), 489 (for operation conduit), and 499 (for other requirements).

Figure 5:
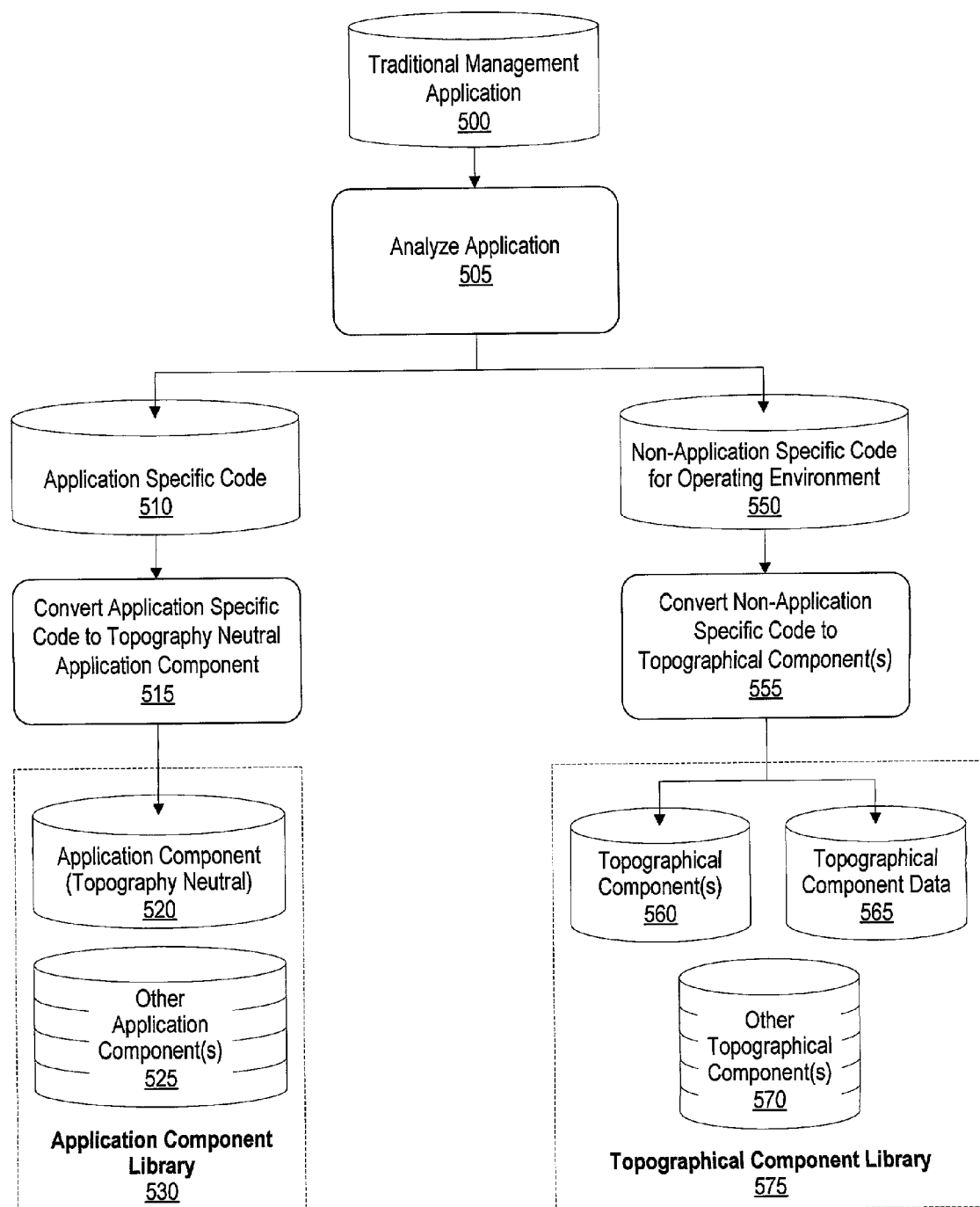
FIG. 5 is a diagram showing a traditional software component being analyzed and divided into topography-specific and topography-neutral components.

FIG. 5 shows a diagram of a traditional software component being analyzed and divided into topography-specific and topography-neutral components. Traditional management application 500 is analyzed (process 500) in order to determine which parts of the application are directed towards application-specific functionality and which parts of the traditional application are directed towards providing the framework of the application to work with the operating environment. Application specific code 510 is identified and converted to topography-neutral application component 520. Topography-neutral application component 520 is stored in application component library 535 along with other application (topography-neutral) components.

Non-application specific code 550, such as code used to communicate with a specific operating environment, is identified and converted to non-application specific code components that are used to implement one or more topographies (process 555). Non-application specific code 550 is stored in topographical component library 575 along with other topographical components 570. Data describing non-application specific code 550 (metadata) is stored in topographical component data store 565. Topographical component data store 565 may include a relational database used to keep track of data pertaining to the various topographical components.

Figure 6:
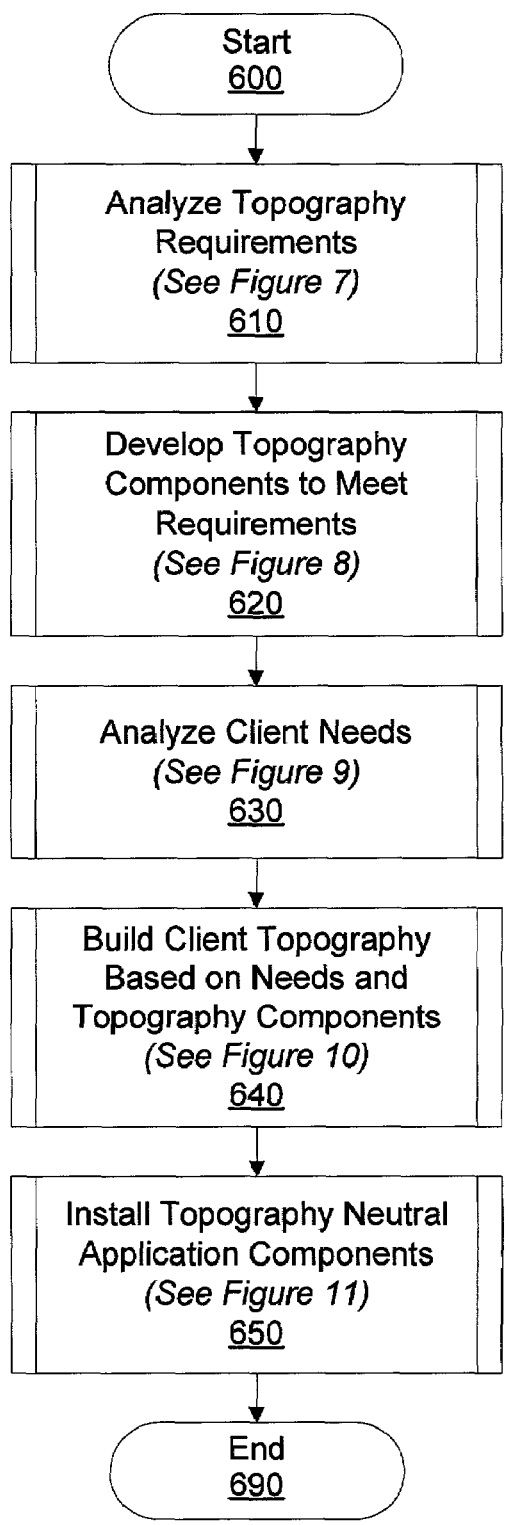
FIG. 6 is a high level flowchart of a topography-based system analysis, design, and installation.

FIG. 6 shows a high level flowchart of a topography-based system analysis, design, and installation.

Figure 7:
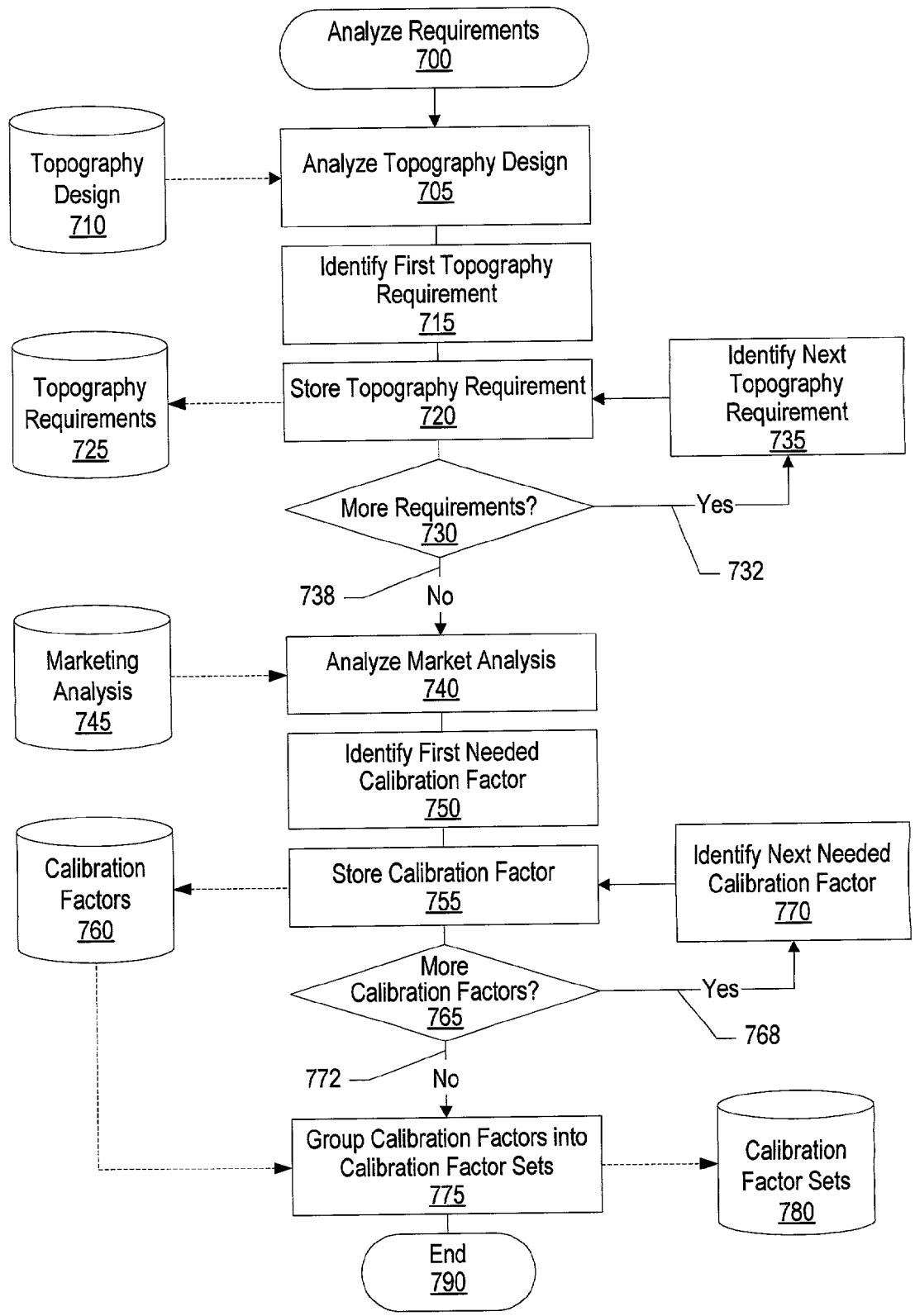
FIG. 7 is a flowchart showing steps taken in analyzing topography requirements.

Processing commences at 600 whereupon topography requirements for supporting a software developer's products are analyzed (predefined process 610, see FIG. 7 for further details). The topography components that were identified during predefined process 610 are developed as topography software components that can be installed and deployed to meet the identified topography needs (predefined process 620, see FIG. 8 for further details).

Figure 9:
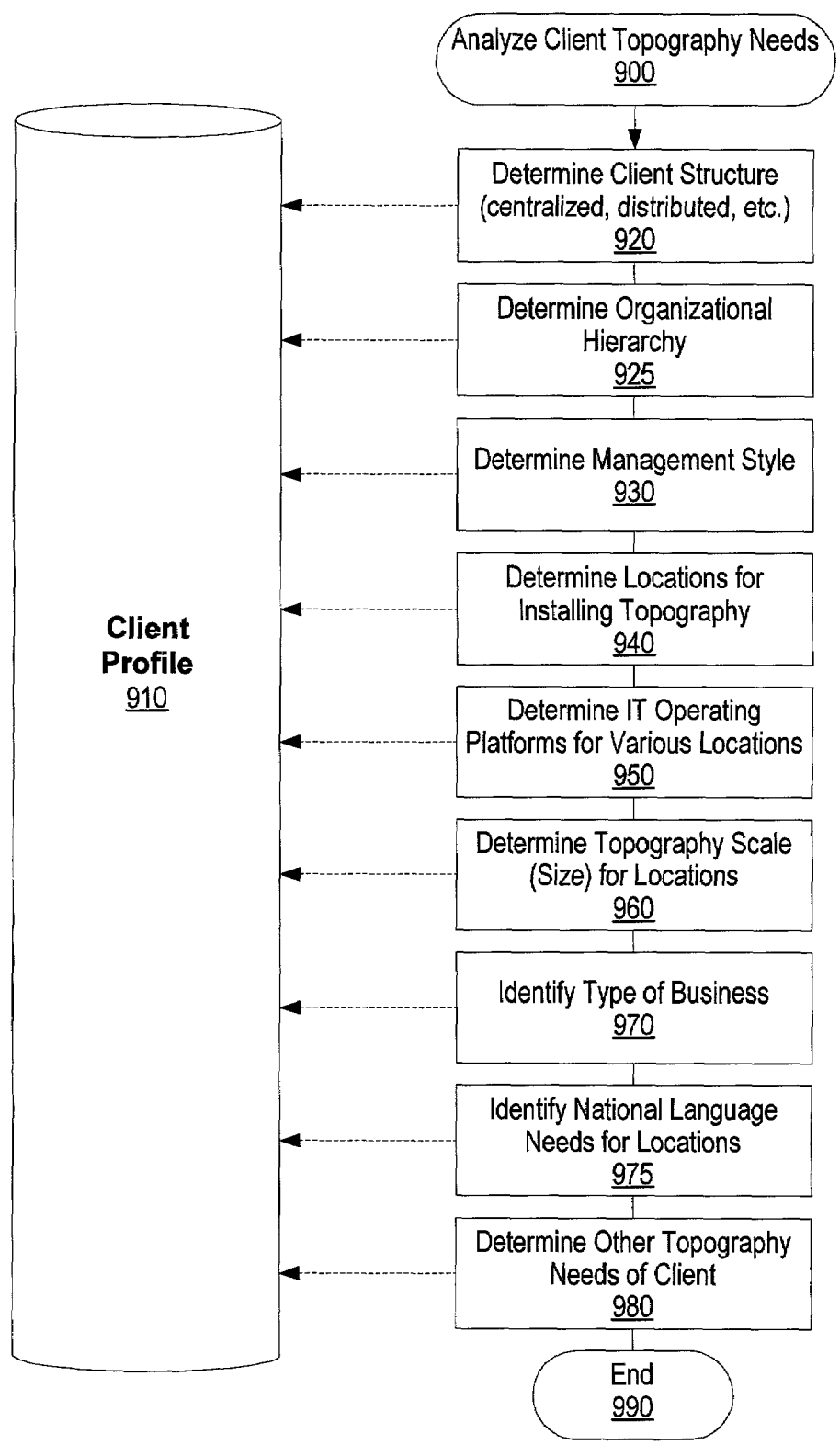
FIG. 9 is a flowchart showing steps taken to analyze a particular client's topography needs.

Once the topography components are built, client needs are analyzed to determine which topography components are best suited for the particular client (predefined process 630, see FIG. 9 for further details). For example, predefined process 630 may determine that a given client is best suited by a decentralized topography with certain control and security components for initiating processes.

Figure 10:
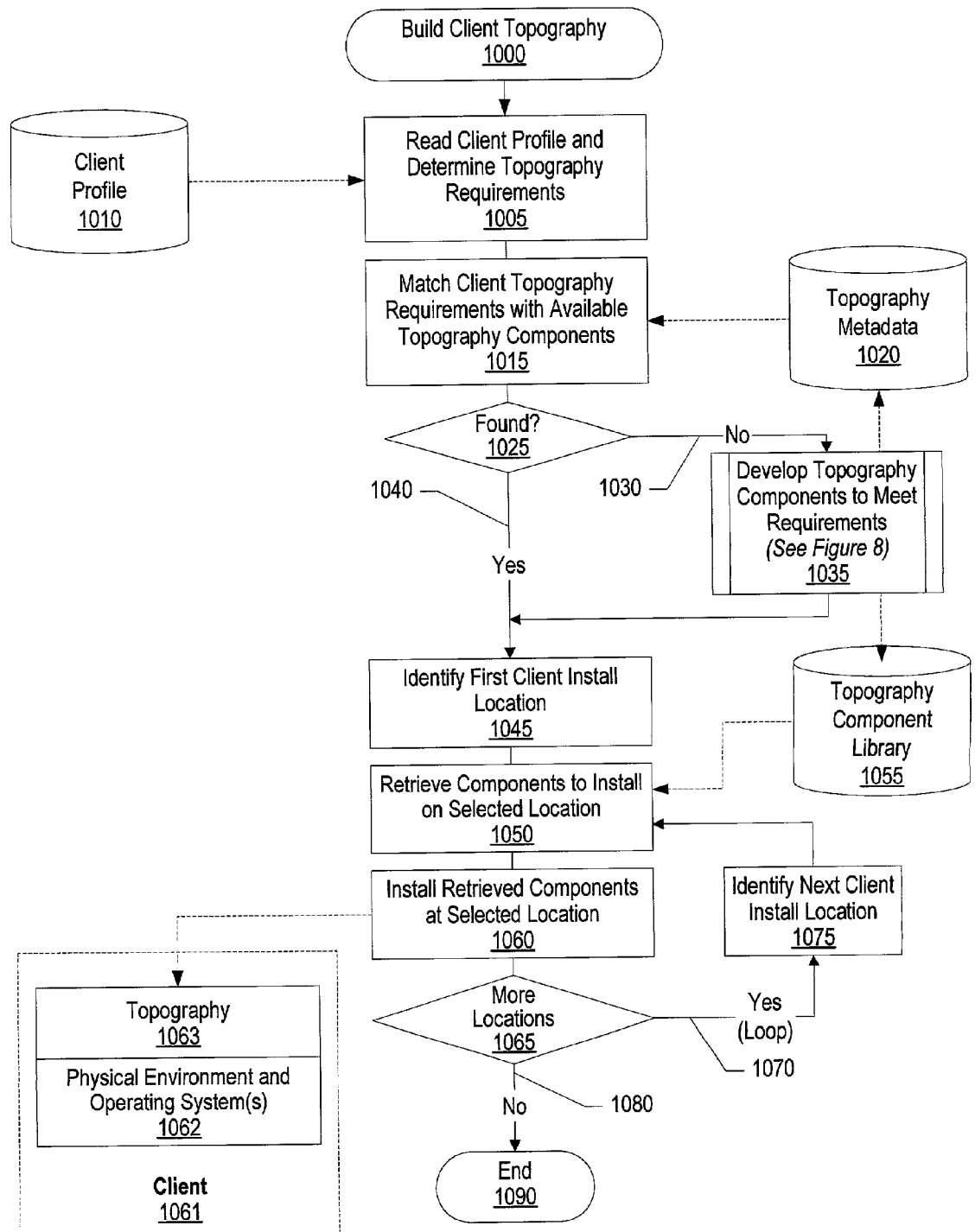
FIG. 10 is a flowchart showing steps taken to build a client's topography based on the client's identified needs.

The client's needs, or requirements, that were identified during predefined process 630 are compared with the topography components that have been built to support various topologies in order to build the client's topography (predefined process 640, see FIG. 10 for further processing details). Once a topography has been identified and installed that addresses the client's management philosophy and methodology, one or more topography neutral components can be selected and installed utilizing the topography (predefined process 650, see FIG. 11 for further processing details). In this manner, the same topography neutral component can be installed with more than one topography. While the topography aligns the system with the client's management philosophy and methodology, the topography-neutral application components provide specific functionality to deal with specific application needs (i.e., accounting), or to handle various resources that are managed by the system. Processing thereafter ends at 690.

FIG. 7 shows a flowchart of steps taken in analyzing topography requirements. Processing commences at 700 whereupon topography design 710 is read and analyzed (step 705). The topography design may be a generic topography designed to support a variety of applications, or may be a more specific design that is designed to support various embodiments of a large application. For example, a generic topography may be designed to handle many applications provided by many different vendors, each of whom understand the generic topography and build applications to interface with the topography. In an example of a more specific topography, the topography can be designed to handle a software vendor's accounting package using a variety of different management philosophies and methodologies and supporting a variety of operating platforms. In this manner, the same accounting software will interface with both a centralized, mainframe-oriented system as well as a distributed system with many personal computers and workstations.

A topography has a variety of components that are designed to meet various topography requirements and programmed to work with other components to form the overall topography (see FIG. 4 for some examples of topography requirements and components). For example, the topography requirements may include designing an operation conduit, a security infrastructure, and a communication framework. The first of such requirements is identified from the topography design (step 715). The topography requirement is stored (step 720) in topography requirements data store 725. A determination is made as to whether there are more topography requirements (decision 730). If there are more requirements, decision 730 branches to "yes" branch 732 which loops back to identify (step 735) and store (step 720) the next topography requirement. This identifying and storing continues until there are no more topography requirements, at which time decision 730 branches to "no" branch 738.

Calibration factors are used to configure topography components to match a particular management philosophy or customer request. For example, an operation conduit may be needed for a topography but the specific operation conduit component to perform the conduit function may be different between one or more topographies. A centralized, mainframe oriented topography is likely to have an operation conduit component that operates in that environment, while another conduit may be created to work in a distributed environment that utilized workstations and personal computers. The calibration factors that the topography vendor is creating is driven by the types of customers that are likely to purchase the topography and other applications. A market analysis helps identify customer needs and requirements as well as identify the various types of possible customers.

Market analysis data store 745, including an analysis of customer types, needs, and requirements, is read and analyzed (step 740). The analysis may also include prioritizing market needs so that topography components that include calibration factors are created in order to satisfy management types, needs, and requirements that are shared by more customers. The analysis also includes identifying calibration factors, such as organizational structure (centralized, distributed, branch office, etc.) that will be used in developing topography components. The first calibration factor resulting from the analyzed market analysis is identified (step 750). The identified calibration factor is stored (step 755) in calibration factors data store 760. A determination is made as to whether there are more calibration factors (decision 765). If there are more calibration factors, decision 765 branches to "yes" branch 768 which loops back to identify (step 770) and store (step 755) the next calibration factor. This identifying and storing continues until there are no more calibration factors, at which time decision 765 branches to "no" branch 773.

Identified calibration factors are read from data store 760 and grouped into calibration factor sets that identify relationships between components that are programmed to address various topography requirements (step 775, see calibration factor sets 410 in FIG. 4 for examples of components that collectively form a calibration factor set). Processing subsequently ends at 790.

Figure 8:
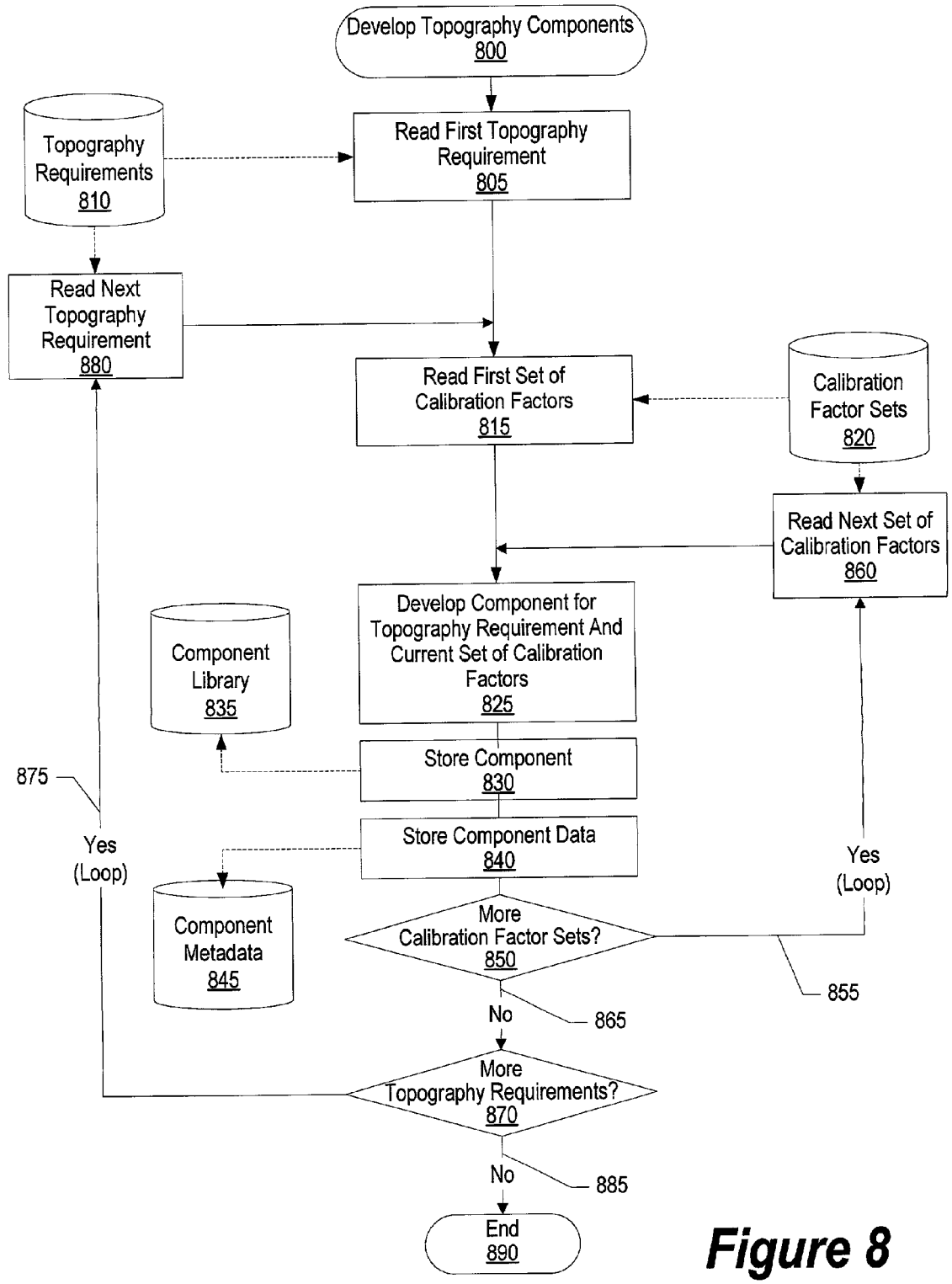
FIG. 8 is a flowchart showing steps taken in developing topography components identified during analysis.

FIG. 8 shows a flowchart of steps taken in developing topography components identified during analysis. Processing commences at 800 whereupon the first topography requirement is read (step 805) from topography requirements data store 810 (see FIG. 7 for details regarding the creation of the topography requirements data store). The first set of calibration factors is read (step 815) from calibration factor set data store 820 (see FIG. 7 for details regarding the creation of calibration factor sets).

A component is developed (i.e., designed, coded, etc.) according to the topography requirement and current set of calibration factors (step 825). The development of the component may be based on an already-existing component or may be developed with little commonality to pre-existing components. In some situations, a component used for one topography requirement and set of calibration factors can be used for another topography requirement and set of calibration factors, in which case a copy of the preexisting component can be used or a pointer to the preexisting component can be used. In addition, some components may be developed to server multiple sets of calibration factors so that one set of calibration factors is handled using a given set of parameters, or options, provided to the component that the component in turn uses to determine the applicable steps taken to address the particular set of calibration factors. The developed component is stored (step 830) in component library 835. When a common component is used for multiple topography requirements and sets of calibration factors, a pointer to the common component may be stored in component library 835 instead of an actual copy of the component. Component metadata, or data describing the component, is stored (step 840) in component metadata data store 845.

A determination is made as to whether there are more calibration factor sets that the developer wishes to address in topography design (decision 850). If there are more calibration factor sets, decision 850 branches to "yes" branch 855 which loops back to read the next set of calibration factors (step 860) from calibration factor set data store 820 and repeat the steps to process the resulting component. This looping continues until there are no more calibration factor sets to handle, at which point decision 850 branches to "no" branch 865 whereupon another determination is made as to whether there are more topography requirements that need to be handled (decision 870).

If there are additional topography requirements that the developer wishes to address, decision 870 branches to "yes" branch 875 which loops back to read the next topography requirement (step 880) from topography requirements data store 810 and repeat the steps to develop components for the topography requirement for each of the calibration factor sets. This looping continues until there are no more topography requirements that need to be addressed, at which point decision 870 branches to "no" branch 885 whereupon processing ends at 890.

FIG. 9 shows a flowchart of steps taken to analyze a particular client's topography needs. Processing commences at 900 whereupon the client's structure is analyzed (step 920) and stored in client profile 910. The client's structure may be identified as being centralized, distributed, branch office, transaction based, small team, hybrid, and other management forms as well as combinations of various structures.

The client's organizational hierarchy is determined (step 925) and stored in client profile 910. The client's organizational hierarchy may be obtained from formal organizational charts that indicate the organizations, such as divisions or departments, involved in performing various business functions for the organization and the relationships between the various identified organizations.

The client's management style is identified (step 930) and stored in client profile 910. For example, the management style may be determined to be a centralized, control-oriented style wherein a centralized management maintains most decision making power. Another management style may be a distributed, branch office style wherein managers at a number of branch offices have decision making power for many decisions at their branch office with a corporate office having strategic decision making power regarding the overall business. Other examples of management style information include whether the organization favors a small team approach versus individual or large team approaches, whether the organization is discipline oriented, whether the organization is resource oriented, whether the organization has a personal style (often found in small businesses), whether no management is required (such as in a sole proprietorship or other type of business), or a hybrid management style, or some other management styles. This information can be gathered by interviewing management including processing responses to questionnaires that, in turn, can be used to compare and contrast the organization to other organizations that have previously been identified as having particular management styles.

The client's locations for installing the topography is determined (step 940) and stored in client profile 910. The locations involved further help determine what type of topography should be built for the client. For example, if the client has facilities in many locations, a non-centralized topography may be better than a centralized topography. On the other hand, if a client has most operations in a single facility, then a centralized topography may be more efficient than a distributed topography. Determining locations also helps identify computer systems upon which topography components will be installed.

The client's current information technology (IT) operating platforms existing in the client's various locations are identified (step 950) and stored in client profile 910. Operating platforms, such as whether a particular location is currently a UNIX-based operating environment, an MS-Windows™ operating environment, an IBM mainframe operating environment, or a multi-operating platform environment help further define the client's needs. In addition, the type of networking used at a location further helps determine how locations are, or can be, linked to one another. A great deal of money and resources are often involved with establishing and supporting the client's operating platform, so understanding the current environment and providing a platform that causes few disruptions with the installed environment is advantageous.

The client's topographical scale, or size, for the locations is determined (step 960) and stored in client profile 910. The size, such as the number of users or number of computers, aids in determining the demands likely to be placed on the topography at various locations. For example, all users may have a MS-Windows computer available but, because of a large number of users or the fact that users wish to access the topography from alternate work locations, it may be determined that more centralized servers should be utilized with each user being able to access the server from any of a number of work locations.

The client's type of business is also identified (step 970) and stored in client profile 910. The type of business, such as whether the client is a retailer, a securities broker, or a software manufacturer, help determine the type of topographical functions that will likely be needed by the client. The client's type of business can also be compared with other clients to identify topographical functionality found useful or advantageous to previous clients. For example, a securities broker may require an enhanced security component for ensuring topographical security in order to maintain the confidential data of customers, while a retailer may require an enhanced communications framework component to allow the client's various retail locations to communicate with each other and with a corporate office in an efficient manner.

National language needs for the client's locations is also identified (step 975) and stored in client profile 910. Identifying national language support aids in ensuring that topographical components installed will either support or communicate using languages used by the client. For example, some character sets such as Kanji, require extra storage (i.e., double-byte character sets) in order to store and display the characters. In addition, messages and other information provided by the topography components to users should be displayed using the user's chosen language.

The client may have other needs that are particular to the client or to the client's type of business that are identified by analysts working with the client (step 980) and stored in client profile 910. When all of the client's topography needs have been gathered and stored in client profile 910, processing ends at 990.

FIG. 10 shows a flowchart of the steps taken to build a client's topography based on the client's identified needs. Processing commences at 1000 whereupon client profile 1010 is read and the client's topography requirements are determined (step 1005, see FIG. 9 for details regarding the creation of client profile 1010). The topography vendor's available topography components 1020 are matched against the client's identified topography requirements (step 1015). A determination is made as to whether components needed to make the client's topography were found in topography metadata 1020 (decision 1025). If the components were not found, decision 1025 branches to "no" branch 1030 whereupon the needed topography components are developed (predefined process 1035, see FIG. 8 for processing details) and data regarding the components are stored in topography metadata 1020 and newly developed components are stored in topography component library 1055. On the other hand, if the needed topography components were found in topography metadata 1020, decision 1025 branches to "yes" branch 1040 bypassing further topography component development steps.

The client's topography may be installed on one location or many locations designed to interoperate to function as an organizational topography. The first client location is identified (step 1045). The location may be a physical location or a computer system within a physical location. The topography components that will be installed on the identified location are retrieved (step 1050) from topography component library 1055. The retrieved components are installed (step 1060) at client 1061 as topography layer 1063 which interacts with the client's physical environment and operating systems 1062. The installation may be performed by transmitting the retrieved component to the location across a network or other transmission means or the retrieved components may be packaged onto a computer medium, such as a CD-ROM or magnetic storage, and physically delivered to the identified location for installation. A determination is made as to whether there are more client locations onto which the topography is installed (decision 1065). If there are more client locations, decision 1065 branches to "yes" branch 1070 which loops back to identify the next client location (step 1075), retrieve the components for the location (step 1050), and install the components at the location (step 1060). This looping continues until there are no more locations to install the topography, at which time decision 1075 branches to "no" branch 1080 and processing ends at 1090.

Figure 11:
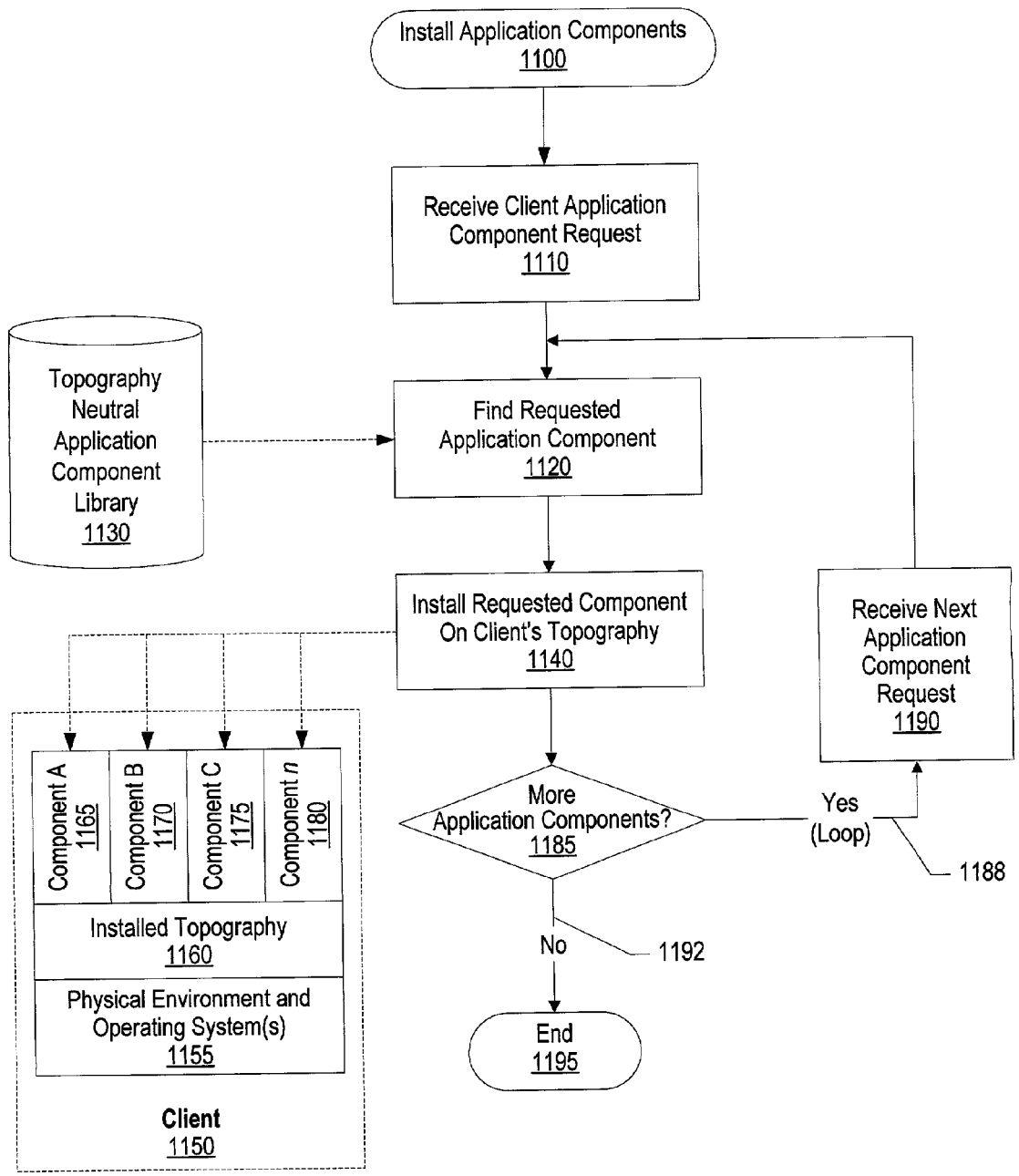
FIG. 11 is a flowchart showing steps taken to install topography neutral application components onto a client's topography.

FIG. 11 shows a flowchart of steps taken to install topography neutral application components onto a client's topography. Processing commences at 1100 whereupon a request is received, either manually or electronic, from a client for an application component that is designed to work with an installed topography (step 1110).

The requested application component is located and retrieved (step 1120) from topography neutral application component library 1130. The retrieved application component is installed on the requesting client's topography (step 1140). Client 1150 has a layered system that forms the operating environment. The client's operating environment includes one or more physical environments and operating systems (1155) upon which one or more topography components (1160) are installed. Application components (1165, 1170, 1175, and 1180) are installed on top of the topography components. The application components are topography neutral so that a common application component can be installed on many different topology installations.

A determination is made as to whether the client wishes to install more application components (decision 1185). If the client requests more application components, decision 1185 branches to "yes" branch 1188 which receives the next application request from the client (step 1190) and loops back to locate and install the next application component. This looping continues until the client has no more application component requests, at which time decision 1185 branches to "no" branch 1192 and processing ends at 1195.

Figure 12:
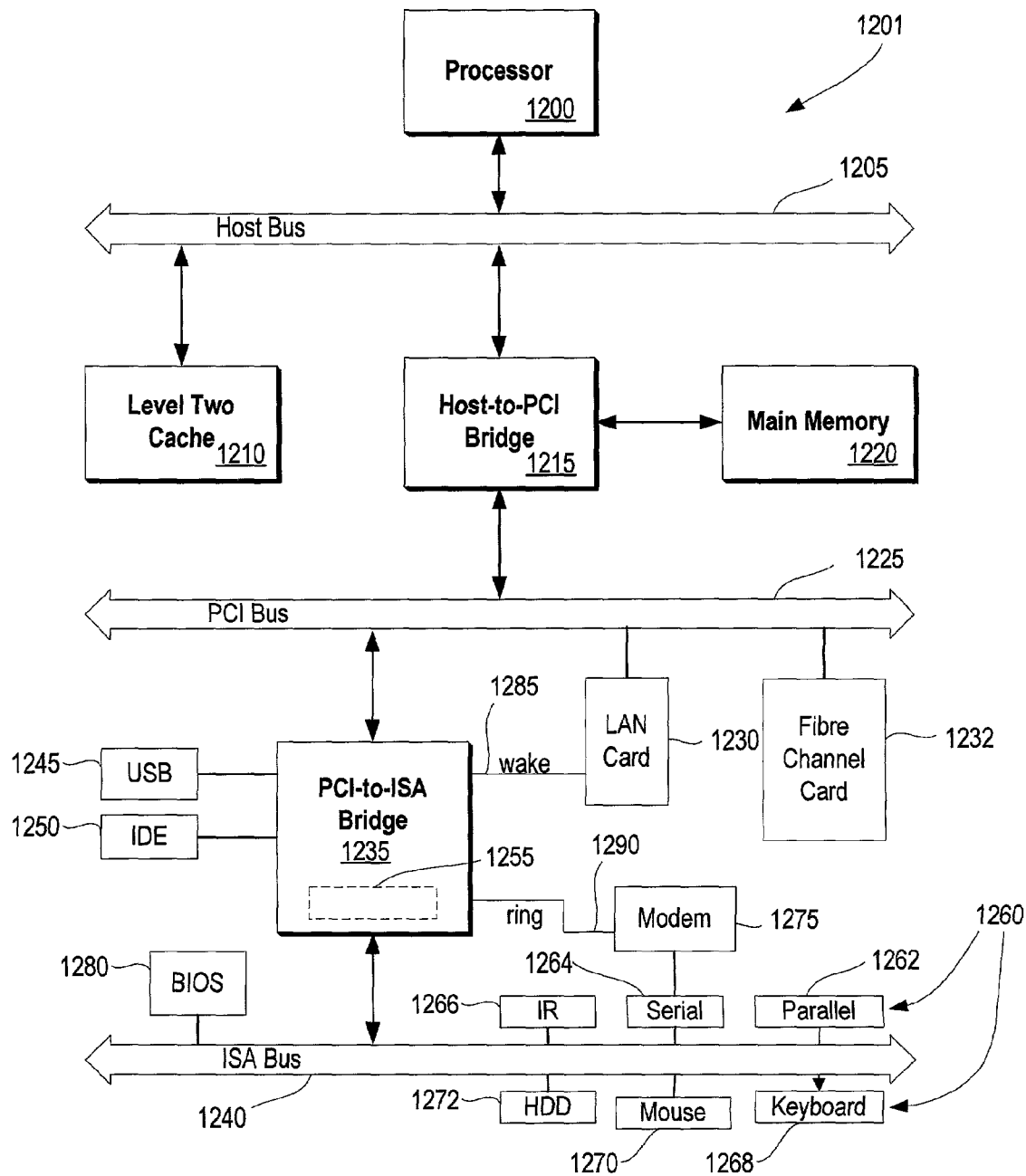
FIG. 12 is a block diagram of an information handling system capable of implementing the present invention.

FIG. 12 illustrates information handling system 1201 which is a simplified example of a computer system capable of performing the server and client operations described herein. Computer system 1201 includes processor 1200 which is coupled to host bus 1205. A level two (L2) cache memory 1210 is also coupled to the host bus 1205. Host-to-PCI bridge 1215 is coupled to main memory 1220, includes cache memory and main memory control functions, and provides bus control to handle transfers among PCI bus 1225, processor 1200, L2 cache 1210, main memory 1220, and host bus 1205. PCI bus 1225 provides an interface for a variety of devices including, for example, LAN card 1230. PCI-to-ISA bridge 1235 provides bus control to handle transfers between PCI bus 1225 and ISA bus 1240, universal serial bus (USB) functionality 1245, IDE device functionality 1250, power management functionality 1255, and can include other functional elements not shown, such as a real-time clock (RTC), DMA control, interrupt support, and system management bus support. Peripheral devices and input/output (I/O) devices can be attached to various interfaces 1260 (e.g., parallel interface 1262, serial interface 1264, infrared (IR) interface 1266, keyboard interface 1268, mouse interface 1270, and fixed disk (HDD) 1272) coupled to ISA bus 1240. Alternatively, many I/O devices can be accommodated by a super I/O controller (not shown) attached to ISA bus 1240.

BIOS 1280 is coupled to ISA bus 1240, and incorporates the necessary processor executable code for a variety of low-level system functions and system boot functions. BIOS 1280 can be stored in any computer readable medium, including magnetic storage media, optical storage media, flash memory, random access memory, read only memory, and communications media conveying signals encoding the instructions (e.g., signals from a network). In order to attach computer system 1201 to another computer system to copy files over a network, LAN card 1230 is coupled to PCI bus 1225 and to PCI-to-ISA bridge 1235. Similarly, to connect computer system 1201 to an ISP to connect to the Internet using a telephone line connection, modem 1275 is connected to serial port 1264 and PCI-to-ISA Bridge 1235.

While the computer system described in FIG. 12 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of calibrating a topography for a client, said method comprising:
   identifying one or more client attributes corresponding to the client;
   grouping a plurality of calibration factors into one or more calibration sets wherein at least one of the calibration factors is selected from the group consisting of centralized management, branch office management, transaction based, small team, hybrid management, discipline oriented management, resource oriented management, and personal management;
   comparing the identified client attributes to one or more topographical components, wherein the comparing further includes comparing the identified client attributes to the calibration factor sets;
   selecting one or more of the topographical components based on the comparing; and
   installing the selected topographical components on one or more client computer systems.

2. The method as described in claim 1 further comprising:
   storing one or more calibration factors corresponding to each of the topographical components in a component metadata file, wherein the comparing further includes comparing the identified client attributes with the calibration factors stored in the metadata file;
   identifying one or more components based on the comparing; and
   retrieving the identified components from a topographical component library.

3. The method as described in claim 1 further comprising:
   packaging the selected topographical components in a topography installation file; and
   transmitting the topography installation file to the client computer system.

4. The method as described in claim 1 further comprising:
   gathering the client attributes, the gathering including examining one or more attributes selected from the group consisting of client organization charts, client information technology, client surveys, client requirements, client physical environments, and client location data.

5. The method as described in claim 1 further comprising:
   installing one or more topography neutral application components on the client computer systems, wherein the topography neutral application components is adapted to interoperate with more than one topography.

6. An information handling system for calibrating a topography for a client, said information handling system comprising:
   one or more processors;
   a memory accessible by the processors;
   one or more nonvolatile storage devices accessible by the processors;
   a topography calibration tool to calibrate a topography installed on a computer system, the topography calibration tool including:
   means for identifying one or more client attributes corresponding to the client;
   means for grouping a plurality of calibration factors into one or more calibration sets wherein at least one of the calibration factors is selected from the group consisting of centralized management, branch office management, transaction based, small team, hybrid management, discipline oriented management, resource oriented management, and personal management;
   means for comparing the identified client attributes to one or more topographical components, wherein the comparing further includes comparing the identified client attributes to the calibration factor sets;
   means for selecting one or more of the topographical components based on the comparing; and
   means for installing the selected topographical components on one or more client computer systems.

7. The information handling system as described in claim 6 further comprising:
   means for storing one or more calibration factors corresponding to each of the topographical components in a component metadata file, wherein the comparing further includes comparing the identified client attributes with the calibration factors stored in the metadata file;
   means for identifying one or more components based on the comparing; and
   means for retrieving the identified components from a topographical component library.

8. The information handling system as described in claim 6 further comprising:
   means for packaging the selected topographical components in a topography installation file; and
   means for transmitting the topography installation file to the client computer system.

9. The information handling system as described in claim 6 further comprising:
   means for gathering the client attributes, the means for gathering including examining one or more attributes selected from the group consisting of client organization charts, client information technology, client surveys, client requirements, client physical environments, and client location data.

10. A computer program product stored in a computer readable storage media for calibrating a topography for a client, said computer program product comprising:
    means for identifying one or more client attributes corresponding to the client;
    means for grouping a plurality of calibration factors into one or more calibration sets wherein at least one of the calibration factors is selected from the group consisting of centralized management, branch office management, transaction based, small team, hybrid management, discipline oriented management, resource oriented management, and personal management;
    means for comparing the identified client attributes to one or more topographical components, wherein the comparing further includes comparing the identified client attributes to the calibration factor sets;
    means for selecting one or more of the topographical components based on the comparing; and
    means for installing the selected topographical components on one or more client computer systems.

11. The computer program product as described in claim 10 further comprising:
    means for storing one or more calibration factors corresponding to each of the topographical components in a component metadata file, wherein the comparing further includes comparing the identified client attributes with the calibration factors stored in the metadata file;
    means for identifying one or more components based on the comparing; and
    means for retrieving the identified components from a topographical component library.

12. The computer program product as described in claim 10 further comprising:
    means for packaging the selected topographical components in a topography installation file; and
    means for transmitting the topography installation file to the client computer system.

13. The computer program product as described in claim 10 further comprising:
    means for gathering the client attributes, the means for gathering including examining one or more attributes selected from the group consisting of client organization charts, client information technology, client surveys, client requirements, client physical environments, and client location data.

14. The computer program product as described in claim 10 further comprising:
    means for installing one or more topography neutral application components on the client computer systems, wherein the topography neutral application components is adapted to interoperate with more than one topography.

* * * * *